(12) United States Patent
Sagefalk et al.

(10) Patent No.: US 8,209,414 B2
(45) Date of Patent: Jun. 26, 2012

(54) INFORMATION COLLECTING SYSTEM

(75) Inventors: Willy Sagefalk, Veberod (SE); Joacim Tullberg, Lund (SE); Johan Adolfsson, Sodra Sandby (SE)

(73) Assignee: Axis AB, Lund (SE)

( * ) Notice: Subject to any disclaimer, the term of this patent is extended or adjusted under 35 U.S.C. 154(b) by 235 days.

(21) Appl. No.: 12/423,307

(22) Filed: Apr. 14, 2009

(65) Prior Publication Data

US 2009/0259747 A1 Oct. 15, 2009

Related U.S. Application Data

(60) Provisional application No. 61/047,188, filed on Apr. 23, 2008.

(30) Foreign Application Priority Data

Apr. 14, 2008 (EP) .................................... 08154475

(51) Int. Cl.
G06F 15/173 (2006.01)
G06F 15/16 (2006.01)
(52) U.S. Cl. ........................................ 709/224; 709/203
(58) Field of Classification Search .................. 709/203, 709/224
See application file for complete search history.

(56) References Cited

U.S. PATENT DOCUMENTS

| | | | | |
|---|---|---|---|---|
| 5,982,418 A * | 11/1999 | Ely | | 348/153 |
| 6,085,244 A * | 7/2000 | Wookey | | 709/224 |
| 6,606,585 B1 * | 8/2003 | Borowsky et al. | | 703/2 |
| 7,555,528 B2 * | 6/2009 | Rezvani et al. | | 709/217 |
| 7,634,662 B2 * | 12/2009 | Monroe | | 713/186 |
| 7,725,568 B2 * | 5/2010 | Ng et al. | | 709/223 |
| 7,954,129 B2 * | 5/2011 | Renkis | | 725/105 |
| 2003/0204602 A1 | 10/2003 | Hudson et al. | | |
| 2004/0015722 A1 * | 1/2004 | Klotz et al. | | 713/201 |
| 2004/0162898 A1 * | 8/2004 | Rich | | 709/224 |
| 2004/0240542 A1 * | 12/2004 | Yeredor et al. | | 375/240.01 |
| 2005/0132414 A1 * | 6/2005 | Bentley et al. | | 725/105 |
| 2006/0004918 A1 * | 1/2006 | Lubeck et al. | | 709/223 |
| 2006/0161960 A1 * | 7/2006 | Benoit | | 725/105 |
| 2006/0199734 A1 * | 9/2006 | Yamashita et al. | | 503/227 |
| 2006/0280207 A1 * | 12/2006 | Guarini et al. | | 370/524 |
| 2007/0217763 A1 * | 9/2007 | Siemens et al. | | 386/112 |
| 2008/0002672 A1 * | 1/2008 | Lin | | 370/352 |
| 2008/0307066 A1 * | 12/2008 | Amidon et al. | | 709/217 |
| 2009/0092283 A1 * | 4/2009 | Whillock et al. | | 382/103 |

FOREIGN PATENT DOCUMENTS

| | | |
|---|---|---|
| JP | 2001274832 A | 5/2001 |
| WO | 2006073348 | 7/2006 |
| WO | 2007073314 | 6/2007 |

* cited by examiner

*Primary Examiner* — Minh-Chau Nguyen
(74) *Attorney, Agent, or Firm* — Volpe and Koenig, P.C.

(57) ABSTRACT

A method for connecting a storage device to an information generating device includes transferring an identifying message from the storage device to a control server via a computer network. The identifying message includes a unique identifier uniquely identifying the storage device, matching a registered information generating system to the unique identifier, and identifying at least one information generating device included in the matched information generating system. A configuration message is transferred from the control server to the storage device, and the configuration message includes an address to the identified at least one information generating device and instructions of interaction. The instructions of interaction are arranged to define how the transfer of generated information is to be performed.

14 Claims, 10 Drawing Sheets

INFORMATION COLLECTING SYSTEM

This application claims the benefit of European patent application no. 08154475.1 filed on Apr. 14, 2008 and U.S. provisional application No. 61/047,188 filed on Apr. 23, 2008, which is incorporated by reference as if fully set forth.

TECHNICAL FIELD OF THE INVENTION

The present invention relates to networked systems in which information is generated and stored for later access. More particular the present invention relates to a method for connecting a storage device to an information generating device in a computer network.

BACKGROUND

In information collecting systems, e.g. monitoring systems, surveillance systems, etc, it is increasingly common to remotely control the system. The main reason for this is that reading or viewing results from information collecting devices is facilitated as it becomes possible to access the information from more or less anywhere. Moreover, the system may be controlled or administrated from virtually any location.

In these systems information generated or collected at an information collecting site is normally stored at a central site supporting a plurality of information collecting sites where the equipment enabling remote access are arranged and are provided with large storage capacity. Such systems are described in the International applications WO 2006/073348 and WO 2007/073314 by Axis AB. Using such centralized storage may be advantageous in that only one site need to be considered in view of protecting information and the equipment storing the information from fire, earthquakes, power interruptions, criminals stealing equipment and/or information. However, the traffic load to the network connecting the centralized storage to the network becomes high and the risk of loosing crucial information when locating all storage capacity at one single site is evident.

The problem of the high traffic load becomes more critical as the requirement of more frequent data updates and higher information collecting capacity at the monitoring devices, e.g. the resolution and frame rate of video cameras used for monitoring or surveillance increases dramatically. Hence, from some information collecting sites the bandwidth is not enough for transfer of the desired amount of information at the desired frequency.

In US 2006/0161960, a security centre appliance is arranged at the information collecting site connecting direct to information collecting devices, in this case wireless IP cameras, thereby avoiding the trouble of bandwidth restrictions on the line out from an information collecting site. However, you will have to set up a security centre appliance at each and every information collecting site. Moreover, setting up and maintaining a security centre appliance is complicated.

In US 2006/0199734, a plurality of data storing servers are connected on a communication network and a plurality of cameras connected with the communication network are divided into a plurality of groups, and the respective groups are related to the respective data storing servers in correspondence. The respective data storing servers import images from the cameras belonging to the corresponding groups and store the imported images.

SUMMARY OF THE INVENTION

One object of the present invention is to provide an improved information collecting system.

The object is achieved by means of a method according to claim 1 and alternatively by means of a method according to claim 12. Further embodiments of the invention are presented in the dependent claims.

In particular, according to a first aspect of the present invention, the object is achieved by means of a method for connecting a storage device to an information generating device, the method comprising transferring an identifying message from the storage device to a control server via a computer network, wherein the identifying message includes a unique identifier uniquely identifying the storage device, matching the unique identifier to a registered information generating system, identifying at least one information generating device included in the matched information generating system, transferring a configuration message from the control server to the storage device, wherein the configuration message includes an address to the identified at least one information generating device and instructions of interaction, transferring a request from the storage device to the information generating device for data generated by the information generating device, the request is formed in accordance with the instructions of interaction, transferring data generated by the information generating device from the information generating device to the storage device in accordance with the request, and storing transferred data at the storage device.

According to a second aspect of the invention the object is achieved by means of a method for connecting a storage device to an information generating device, the method comprising transferring an identifying message from the storage device to a control server via a computer network, wherein the identifying message includes a unique identifier uniquely identifying the storage device, matching the unique identifier to a registered information generating system, identifying at least one information generating device included in the matched information generating system, transferring a configuration message from the control server to the information generating device, wherein the configuration message includes an address to the storage device and instructions of interaction, transferring data generated by the information generating device from the information generating device to the storage device in accordance with the instructions of interaction, and storing transferred data at the storage device.

By using any of the methods according to the two aspects the setup of additional storage devices, e.g. connecting and associating additional storage capacity, of a storage device to one or a plurality of information generating devices in an information generating system is facilitated. Moreover the scalability of the storage capacity of the system is increased as it becomes possible to simply connect additional storage devices to the network and having them registered in the control server. Thus, more capacity may be added by means of connecting additional storage devices to the network and having such additional storage devices associated to the information generating system.

According to a specific embodiment the transfer of an identifying message from the storage device to a control server is transferred from a private network to a public network, wherein the private network is connected to the public network via an access limiting device. The access limiting device may be any device limiting the access to devices in the private network, e.g. a firewall, a device implementing Network Address Translation (NAT), etc.

One advantage of the storage device being arranged in a private network and the control server in a public network is that the storage device then may take some of the load from the communication link to the private network. Hence, the method facilitates balancing the load of a weak link of a system. Another advantage is that the information generating system may be able to make use of information having more density in time than the capacity of the link between the private network and the public network allow, e.g. video sequences having improved resolution and/or higher frequency.

According to another embodiment the control server transfers a test request from the control server to the storage device and/or an information generating device, the request including addresses to devices registered as being part of the matched registered system, and sending from the storage device in response to the transfer of a test request a test message to the addresses included in the test request for testing of the connection to each of the devices assigned said addresses.

The advantage of testing the connection between devices included in the system is that the storage scheme, i.e. the scheme controlling where to send data for storage, may be optimized.

According to one embodiment a test request is sent from the control server to the storage device instructing the storage device to transfer a test message to the information generating device, in addition a test request is sent from the control server to the information generating device instructing the information generating device to transfer a test message to the storage device. The advantage of sending test messages in both directions over a communication path between a storage device and an information generating device may make it possible to find a route for enabling storage of data from the information generating device even when a path or a route is blocked for access in one direction. Hence, the usability of the system may be enhanced.

According to a further embodiment a test result, resulting from the sending of the test message, is returned to the control server, and the test result is analyzed at the control server and is used for generating instructions of interaction.

According to yet a further embodiment the method further comprises returning a test result, resulting from the sending of the test message, to the control server, analyzing the test result at the control server, and generating instructions of interaction based on the analysis.

According to yet a further embodiment the test result includes information indicating accessibility of devices from the device sending the test message.

In another embodiment the transferring of the instructions of interaction includes transferring information instructing the storage device to request a specific data rate from a specific information generating device. Hence, the advantage of enabling the storage device to request a specific data rate, e.g. a data rate being less than the data rate generated by the monitoring device, may be that it makes it possible to split the data stream into a plurality of data streams which each may be stored at different storage devices or different locations. Thereby, the risk of loosing all data from failure of a storage device is reduced. Similar advantages are exhibited in an embodiment wherein the transferring of the instructions of interaction includes transferring information instructing the information generating device to transmit a specific data rate to a specific storage device.

According to another embodiment the method further comprises identifying a second storage device included in the matched registered system, transferring a configuration message and instructions of interaction from the control server to the second storage device in addition to the configuration message transferred to the first storage device, and transferring a request from the second storage device to the information generating device for data generated by the information generating device, the transferring of the request is performed in accordance with the instructions of interaction received from the control server. Another embodiment comprises identifying a second storage device included in the matched registered system, transferring a configuration message and instructions of interaction to the information generating device from the control server, the configuration message includes the address to the first storage device, the address to the second storage device, and instructions of interaction instructing the information generating device to transmit a portion of the information to the first storage device and a portion of the information to the second storage device. The advantage of identifying a second storage device already present in the information generating system and changing the instructions of interaction for that second storage device is that scalability and optimization of the system becomes possible. Further, the method facilitates tailoring the performance of the system both in view of capacity and in view of redundancy.

According to yet another embodiment transferring of data generated by the information generating device includes transferring image information defining image frames of an image sequence generated by the information generating device and the image information is divided into image information portions. Another advantage of the system is that it enables effective handling of generated information in the form of image sequences, e.g. moving images, streaming video sequences, frequently updated images, etc. The image information is divided into image portions in which each image portion may correspond to an image frame of the image sequence. Further, each portion may correspond to a group of image frames. The group of image frames may be defined as a specific number of frames and the number of frames may vary from group to group.

According to another embodiment wherein the method further comprising receiving at a first storage device image information defining every n:th image information portion of the image sequence transferred from the information generating device and receiving at a second storage device image information of the image sequence defining a frame transferred from the information generating device in between the frames transferred to the first storage device. One advantage of this is that the system may be made redundant in a storage efficient way. In some implementations it may cost some quality, in view of frequency, but in other such quality issues are negligible.

In a further embodiment the variable n equals the number of storage devices receiving image information from the information generating device and wherein each one of n-1 storage devices receives image information defining one image information portion in between the receipt of image information defining an image information portion at the first storage device.

In another embodiment the variable n equals two and thereby a first storage device, of the resulting two storage devices, receives and store image information defining every second image information portion of the image sequence transferred from the information generating device and a second storage device receives and store image information defining the image information portions between the image information portions received and stored by the first storage device.

According to another embodiment the method comprises storing at a first storage device image information transferred from the information generating device and storing at a second storage device identical image information as the image information stored at the first storage device. According to one embodiment image information from an information generating device is stored at a first storage device and mirrored to a second storage device.

According to yet another embodiment a portion of the image information from an information generating device is stored on a first storage device, another portion of the image information is stored on a second storage device, and parity data calculated from the portion stored on the first storage device and the portion stored on the second storage device is stored on a third storage device. The calculation of parity data is arranged to enable calculation of image information stored on the first storage device from the image information stored on the second storage device in combination with the parity data and/or enable calculation of the image information stored on the second storage device from the image information stored on the first storage device and the parity data.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from 15 this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF AN EMBODIMENT

Figure 1:
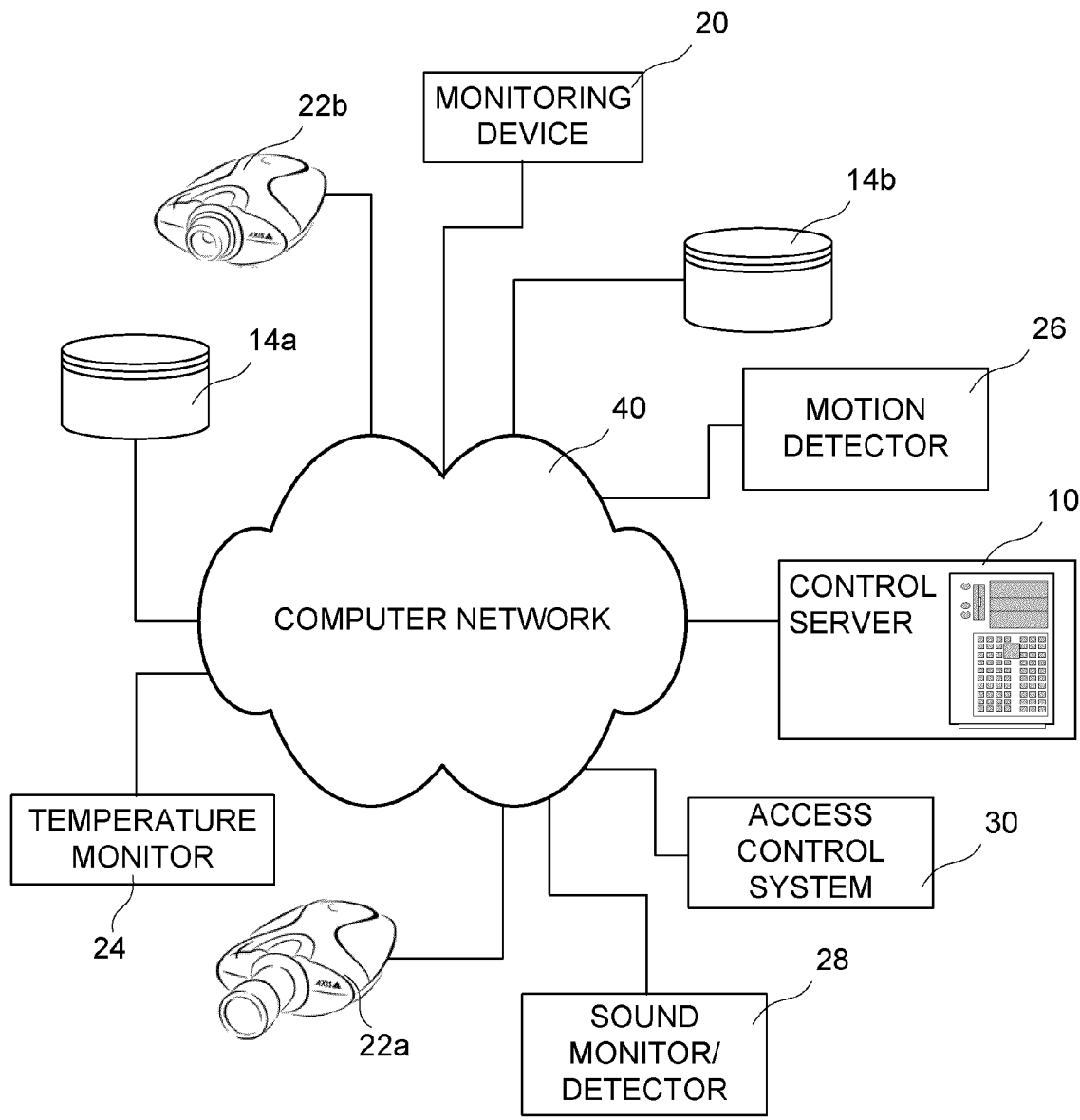
FIG. 1 shows a schematic block diagram over a system implementing the invention.

An information generating system or monitoring system implementing the invention according to one embodiment is schematically depicted in FIG. 1. In order to facilitate the understanding of the invention, the system will hereinafter be referred to as a monitoring system. The system may include a control server 10, at least one storage device 14a-b, a monitoring device 20, 22a-b, 24, 26, 28, and/or an access control system 30. The control server 10 is arranged to manage user access to the monitoring system and to enable access to surveillance data originating from monitoring devices. The monitoring device may be any device that may be used for monitoring physical events. Some examples of some possible monitoring devices are a camera 22a-b, e.g. a digital video camera, a temperature monitor 24, a motion detector 26, or a sound monitor 28. The access control system 30 may be a card reader for allowing entry as a result of a valid and authorized card being presented to the card reader, a keypad for allowing entry as a result of a valid code being keyed on the card reader. Further, the access control system may be a combination of the card reader and the key pad. Moreover, the access control system may include biometric readers. The control server 10, the storage device 14a-b and the monitoring device 20, 30 22a-b, 24, 26, 28, are all connected to each other via a computer network 40.

According to one embodiment of the invention the installation of a storage device in the monitoring system is facilitated. According to this embodiment, see FIG. 2, the installation begins with the act of connecting the storage device to the computer network, step 100. Then the storage device is activated to set up a connection to the control server, step 102, allowing the storage device and the control server to communicate. When communication between the storage device and the control server is established, the control server initiates a matching of the storage device to a monitoring system, step 104. The control server may then match the storage device to one or a plurality of monitoring devices of the monitoring system. The matching may be performed manually in the control server by a person authorized to manage the monitoring system or it may be performed automatically by the control server based on information of the monitoring system. Further, the control server is setting up a scheme for storage, step 108. The scheme for storage is based on information of the monitoring system and/or selections made by the person authorized to manage the monitoring system. The scheme for storage may define where monitoring data from a particular monitoring device is to be stored. It may also define how frequent such data is to be stored and how to perform the transfer.

From the scheme for storage configuration information is generated. The configuration information is sent to at least the devices concerned by the configuration information, step 110. Then the new configuration of the monitoring system is in working order and the new storage device receives data to be stored from one or a plurality of information generating devices, step 112.

The configuration information sent from the control server may include a specific configuration information message for each device concerned. Configuration information may include information of interaction. The information of interaction may for instance be that the storage device is to request data from a monitoring device or that the monitoring device is to write data to the storage device. The information of interaction may also include information of frequency data storage and quantity of data there is to be stored at a specific storage address or storage device.

Figure 2:
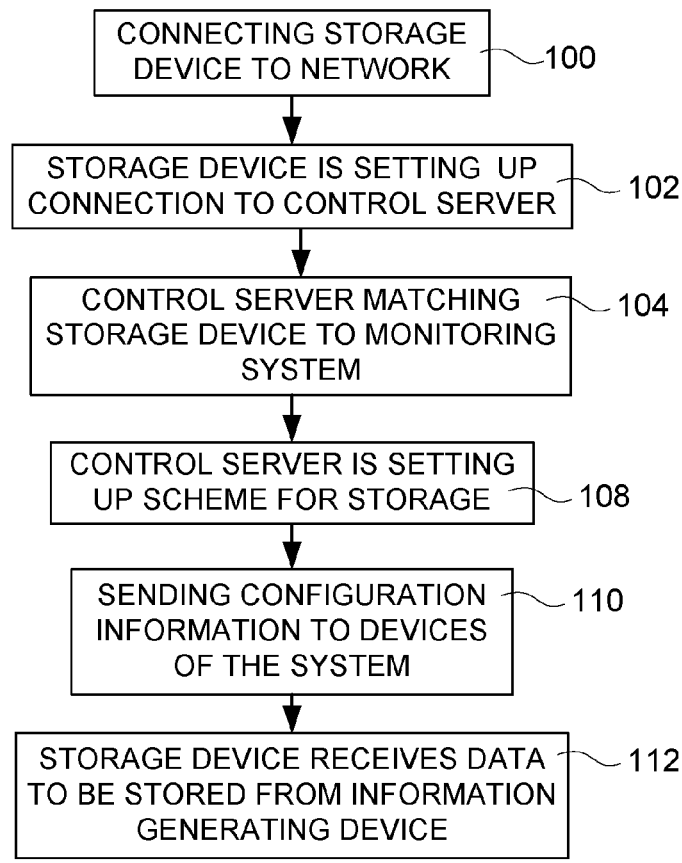
FIG. 2 is a flowchart of a method according to the invention.
Figure 3:
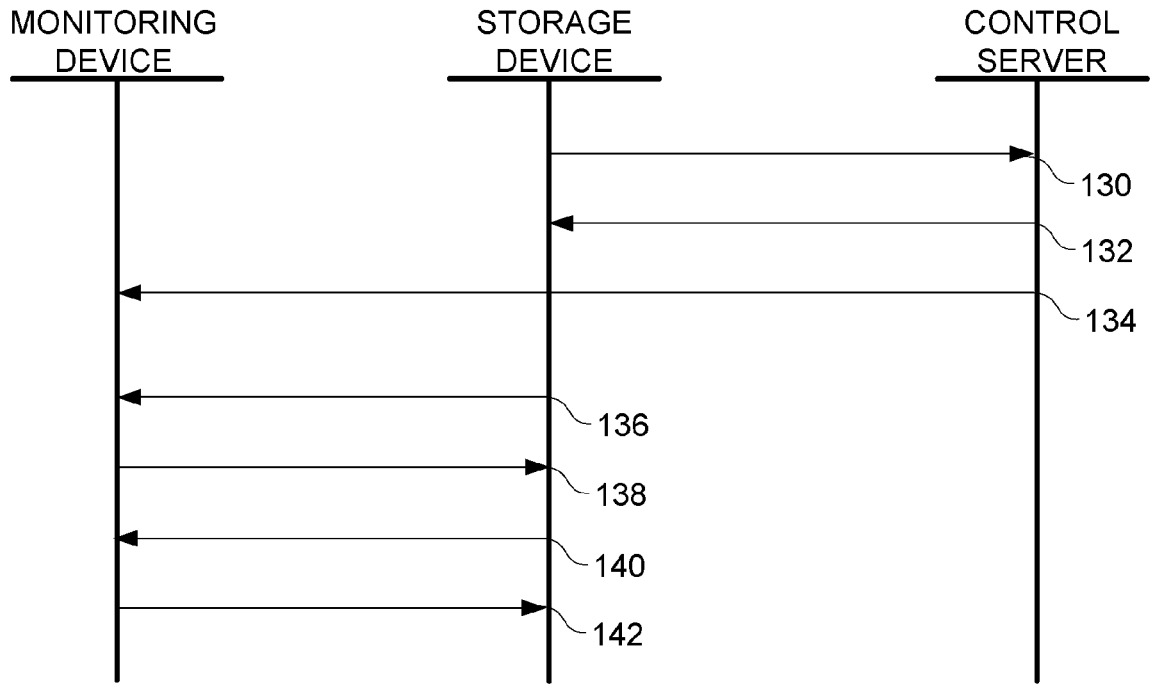
FIG. 3 is a timing diagram showing communication in a system implementing the method of FIG. 2.

The signalling that may be involved when performing the method of FIG. 2 is showed in FIG. 3. Initially the storage device sends a connection message 130 to the control server. The control server responds with a configuration message 132 providing information of interaction defining how the storage device is supposed to act as part of the monitoring system. Moreover, if the addition of the storage device has an effect on the processes of the monitoring device a configuration message 134 is sent from the control server to the monitoring device as well. Then the monitoring system is set to operate in the new configuration and the storage device sends a request of monitoring data to the monitoring device 136. In response to the request 136 the monitoring device sends the monitoring data 138 to the storage device. When it is time to store the next monitoring data the storage device once again sends a request of monitoring data 140 to the monitoring device and the monitoring device responds once more by sending monitoring data 142 to the storage device. Then, the process is continued in this way until instructions from the control server instructs otherwise.

The process of transferring monitoring data may, as discussed above, exclude the step of the storage device requesting the monitoring data, 136 and 140. In such a case the monitoring device controls when and what to transfer and simply transfers the monitoring data, 138, 142, to the storage device, i.e. the signalling may be the same as showed in FIG. 3 with the exception of the signals 136 and 140 which are not used.

Figure 4:
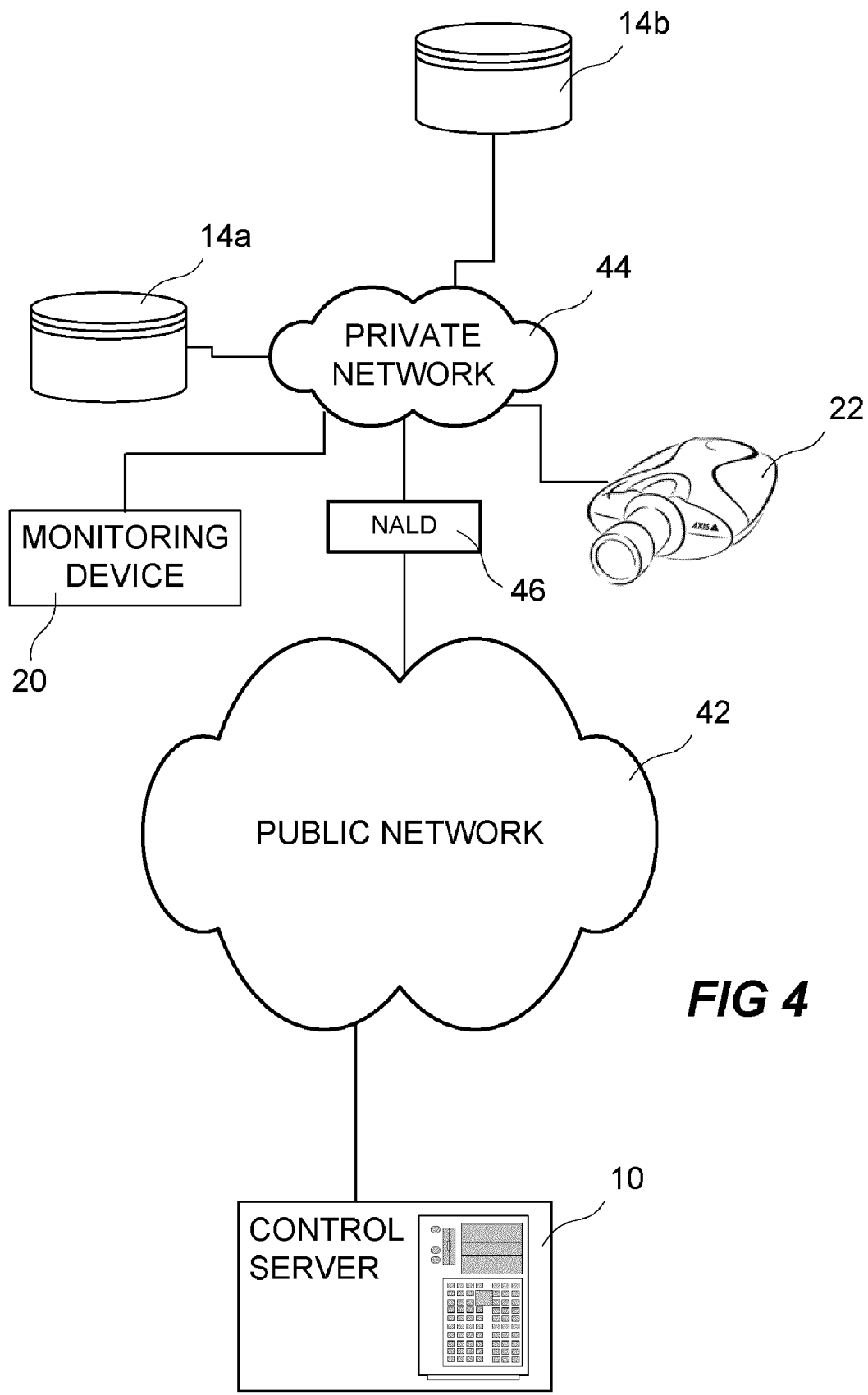
FIG. 4 shows a schematic block diagram over another system implementing the invention.

According to a particular embodiment, it is possible to manage a monitoring system according to FIG. 4. The monitoring system of FIG. 4 may include the same devices as described in connection with FIG. 1, however, in order to make the figure clearer, some devices are left out of the figure. A difference between the system of FIG. 1 and the system of FIG. 4 is that some devices of the monitoring system of FIG. 4 is connected to a public network 42 and other devices of the monitoring system is connected to a private network 44. In particular the control server 10 is connected to the public network and the monitoring devices 20, 22 and the storage devices 14a-b are connected to the private network 44.

The private network 44 is connected to the public network 42 by a network access limiting device 46. The network access limiting device 46 may be a firewall installed to protect the private network, it may be a device performing Network Address Translation, NAT, making it substantially impossible for a device external to the private network to directly access a device on the private network, or any other access limiting device known to the person skilled in the art. Accordingly, the monitoring devices 20, 22 and the storage devices 14a-b are connected to the control server 10 via the private network 44, the network access limiting device 46, and the public network 42.

In the embodiment of FIG. 4, the monitoring system may be seen as including locally arranged monitoring devices 20, 22 generating monitoring information, e.g. moving images, locally arranged storage devices 14a-b for storing the generated information and a local private network 44 connecting the monitoring devices 20, 22 and the storage devices 14a-b. The control server 10 may be arranged remotely from the private network 44.

By arranging the storage device locally on the same private network, it becomes possible to enable access to previously captured high quality images even in cases where the connection of the private network to the network of the control server do not have the capacity, i.e. low bandwidth, to continuously transfer all the required video information to the control server 10. This is accomplished by transferring high quality information, e.g. monitoring data, from any of the monitoring devices 20, 22 to the local storage devices 14a-b via the private computer network 44. Thereby, the high quality may be downloaded via a slower connection, probably during a longer period of time than a live viewing, and do not have to be immediately transferred to the public network 42, which may not have enough capacity.

Further, the system avoids overloading the public network with monitoring data that are not of particular interest. In order to use even less bandwidth and make the system operate even in cases when the communication line from the private network 44 to the public network 42 is down or sabotaged the operation of storing information on the storage device 14a-b is controlled by the monitoring device 20, 22 and/or the storage device 14a-b only, i.e. no engagement from the control server is necessary during the actual transfer of monitoring data from a monitoring device 20, 22 to a storage device 14a-b.

Figure 5:
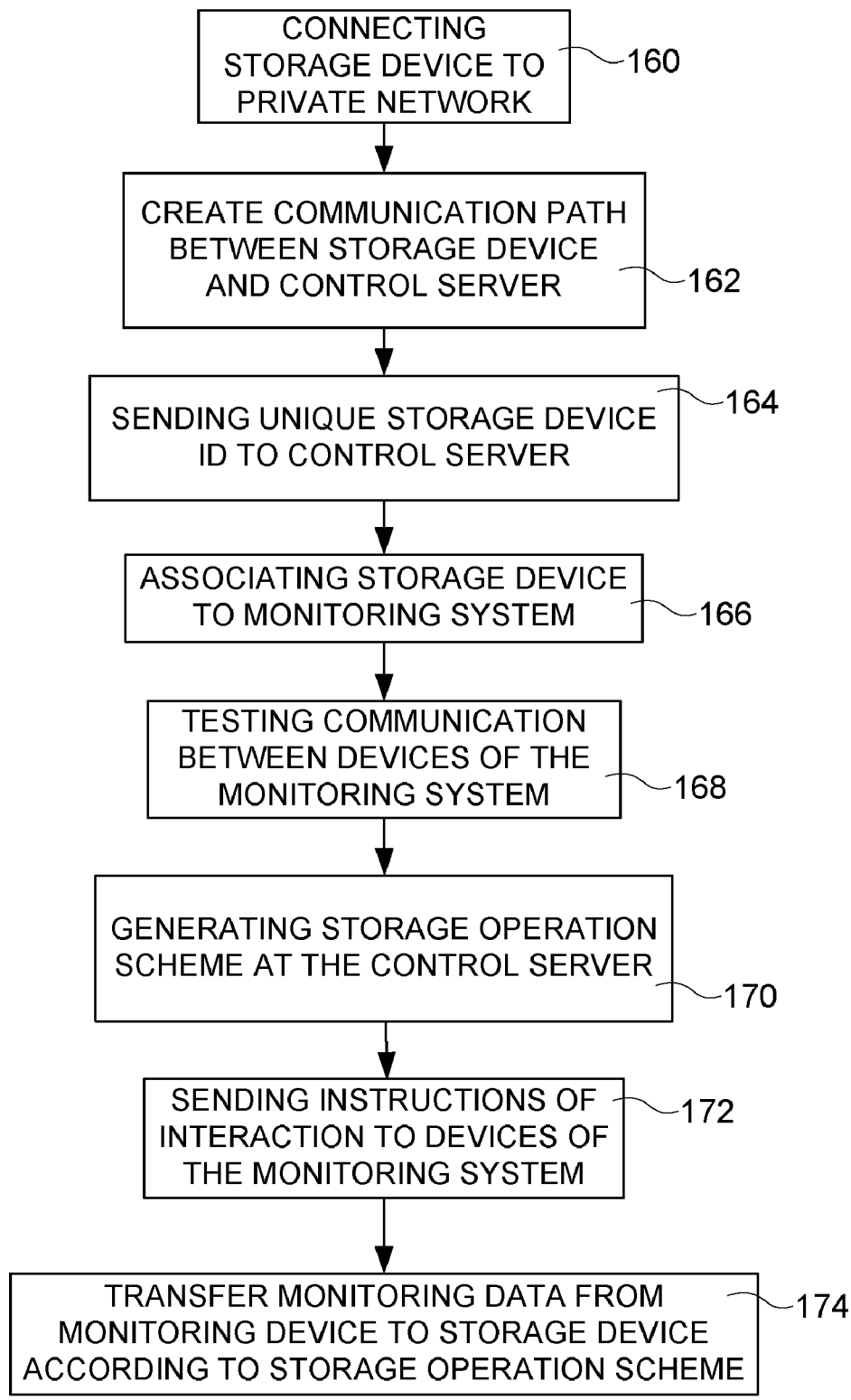
FIG. 5 is a flowchart of a method according to the invention for connecting a storage device to a information generating system.

In FIG. 5, one method according to the invention is presented. This method functions even if the control server 10 is separated from the storage device 14a and/or the monitoring device 20 by a network access limiting device 46. The storage device 14a is connected to the private network 44, step 160. When the storage device 14a is connected to the private network 44 it sends a connection message to the control server. The connection message is sent in response to the storage device 14a being connected to the private network 44 or in response to a user action on the storage device 14a. The address to the control server 10 may be stored in the storage device 14a during manufacturing. The connection message initiates the opening of a communication path from the control server 10 through the network access limiting device, step 162, to the storage device 14a, as will be disclosed in more detail below. A unique identifier, which is stored in the storage device 14a, preferably during manufacturing of the storage device 14a, is sent from the storage device 14a to the control server 10, step 164, to identify the storage device 14a to the control server 10. The identifier is processed by the control server 10 and the storage device 14a is associated to a monitoring system by the control server 10, step 166. The processing of associating the storage device to a monitoring system may include matching the received unique identifier to identifiers stored in a register at the control server 10. This corresponding unique identifier may previously have been entered into the register of the control server and may then have been associated with the user or the organization that is responsible for the monitoring system that the storage device is to be connected to. The unique identifier may also be registered and associated to a user or organization after the storage device has sent the connection message. One way of entering the unique identifier and associating it to a user or organization is to have the user or a representative of the organization login to the control server and enter the unique identifier shipped with the storage device.

When the storage device has been associated to a monitoring system the control server 10 retrieves information regarding monitoring devices 20, 22 and possibly other storage devices 14b associated with the same user or organization as the newly added storage device 14a. Then the control server 10 initiates a testing of the communication paths between devices of the monitoring system, step 168. The test is essentially performed by the devices of the monitoring system, as will be explained in more detail below. The path from a storage device to one or a plurality of monitoring devices may be tested, the path from a monitoring device to one or a plurality of storage devices may be tested, or any combination of these paths may be tested. From the test, the control server gets information of which devices 14b, 20, 22 of the monitoring system that the newly added storage device 14a is able to send messages to and of which devices 14b, 20, 22 of the monitoring system that are able to send messages to the newly added storage device 14a. The test may also provide additional information, e.g. the capacity of the different communication paths, reliability, etc.

A storage operation scheme is then generated, step 170, in the control server based on the test result. From the storage operation scheme instructions of interaction for the devices that needs to change operation scheme or needs a new operation scheme based on the generated storage operation scheme are extracted. The storage operation scheme may be manually generated by a user using the test result as input, automatically generated by the control server based on the test results, or semi automatically generated by the control server supported by a user managing the system. An instruction of interaction basically instructs a device at which storage device monitoring data from a particular monitoring device is to be stored. Moreover, the instruction of interaction may also include instructions regarding the frequency of storage of particular monitoring information at a particular storage device. The instruction of interaction may include all information needed by a monitoring device and/or a storage device for it to autonomously see to that monitoring information from the monitoring device is stored at the storage device, e.g. the instruction may include addresses or URLs to devices intended to interact with and/or other access parameters enabling access to specific devices. The instructions of interaction are sent to the devices that according to the new storage operation scheme need new instructions, step 172. Then monitoring data is transferred from a monitoring device 20, 22 to a storage device 14a-b in accordance with the instructions of interaction and thus the storage operation scheme, step 174.

Figure 6A:
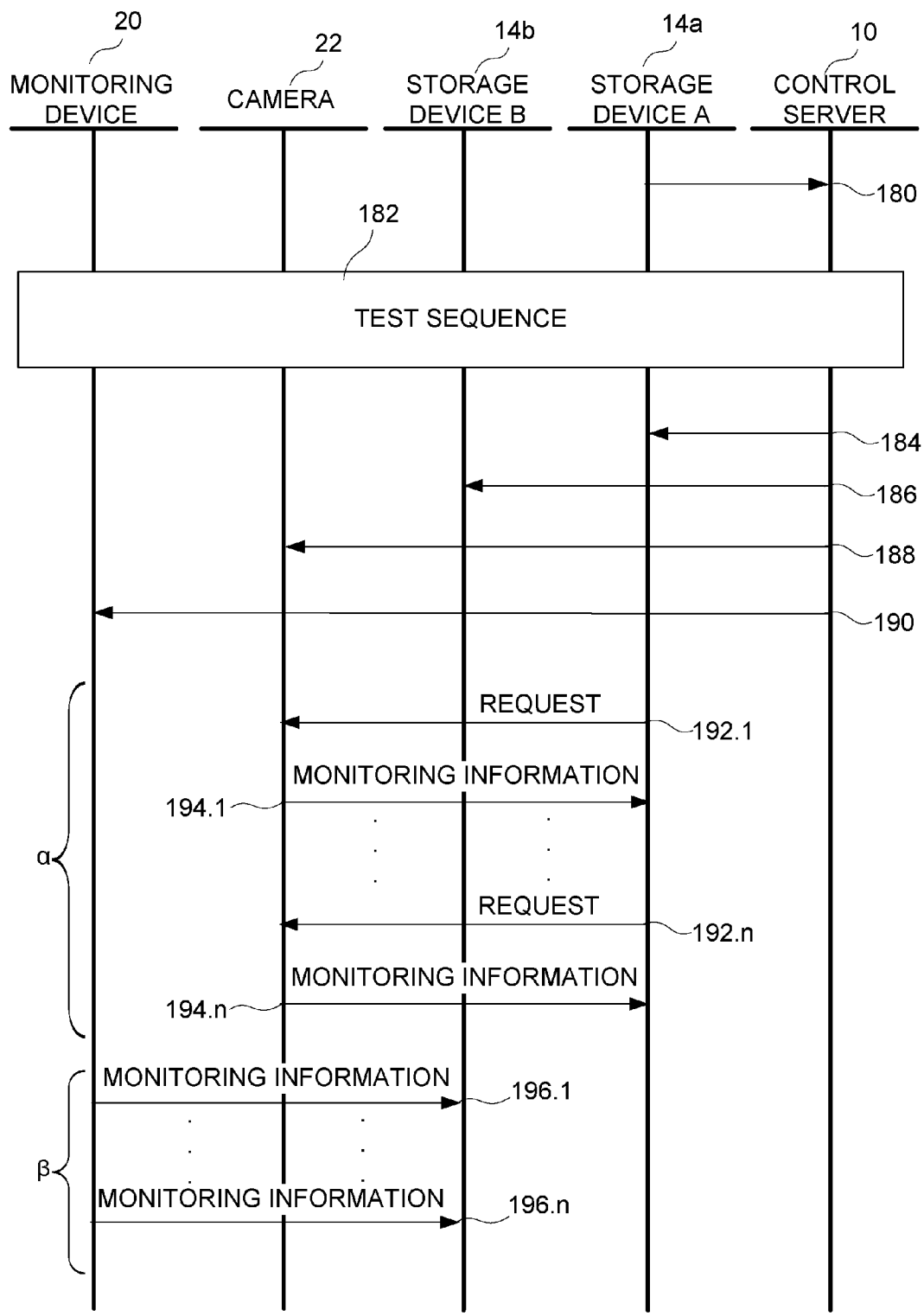
FIG. 6a is a timing diagram showing communication is a system implementing the method of FIG. 5.

Messages sent during the processing of the above process are showed in FIG. 6a. Initially the connection message 180 is sent from the storage device 14a to the control server 10 in order to inform the control server of its presence and to request connection to a monitoring system. The communication between the storage device 14a and the control server 10 in order to set up the connection and identifying the storage device may include further messages being sent over the network and one special case of communication in regard of setting up the connection when the storage device 14a is arranged behind a network limiting device 46 from the perspective of the control server 10 will be described below. Then the control server initiates and perform testing of the communication paths between devices of the monitoring system, the communication 182 associated with this testing will be described in detail below. After the results from the test sequences have been returned to the control server 10 the control server sends messages including instructions of interaction to the devices requiring new instructions based on the new storage operation scheme. In FIG. 6a one message 184 including instructions of interaction is sent to the new storage device 14a, one message 186 is sent to the storage device 14b already registered in the monitoring system, one message 188 is sent to the camera 22, and one message 190 is sent to the monitoring device 20. Depending on the storage operation scheme set at the control server 10 any combinations or even a single one of the messages 184-190 may be sent.

Then the monitoring system is set to use the new storage device for storing monitoring information. In FIG. 6a two different ways of controlling the transfer of monitoring information is shown.

In one method, α, depicted by the signaling between the camera 22 and the new storage device 14a, the storage device has been instructed by the control server to request the monitoring information from the camera 22. Hence, the storage device 14a sends a request 192.1 for monitoring information to the camera 22. In response to the request 192.1 the camera 22 sends the requested monitoring information 194.1 to the storage device 14a. Additional requests 192.n are sent from the storage device 14a at a predetermined frequency and thereby frequently updated monitoring information 194.n are sent to the storage device. The camera of this example may as well be any monitoring device, however if it is a camera the monitoring information may be image information.

In another method, β, depicted by the signalling between the monitoring device 20 and the storage device 14b, the monitoring device has been instructed by the control server to transfer monitoring information to the storage device 14b at a specific frequency. Hence, the monitoring device sends a message 196.1 including monitoring information to the storage device 14b for storing and the storage device receives and stores the monitoring information. Additional messages 196.n including monitoring information is sent at points in time determined by the required frequency.

Figure 6B:
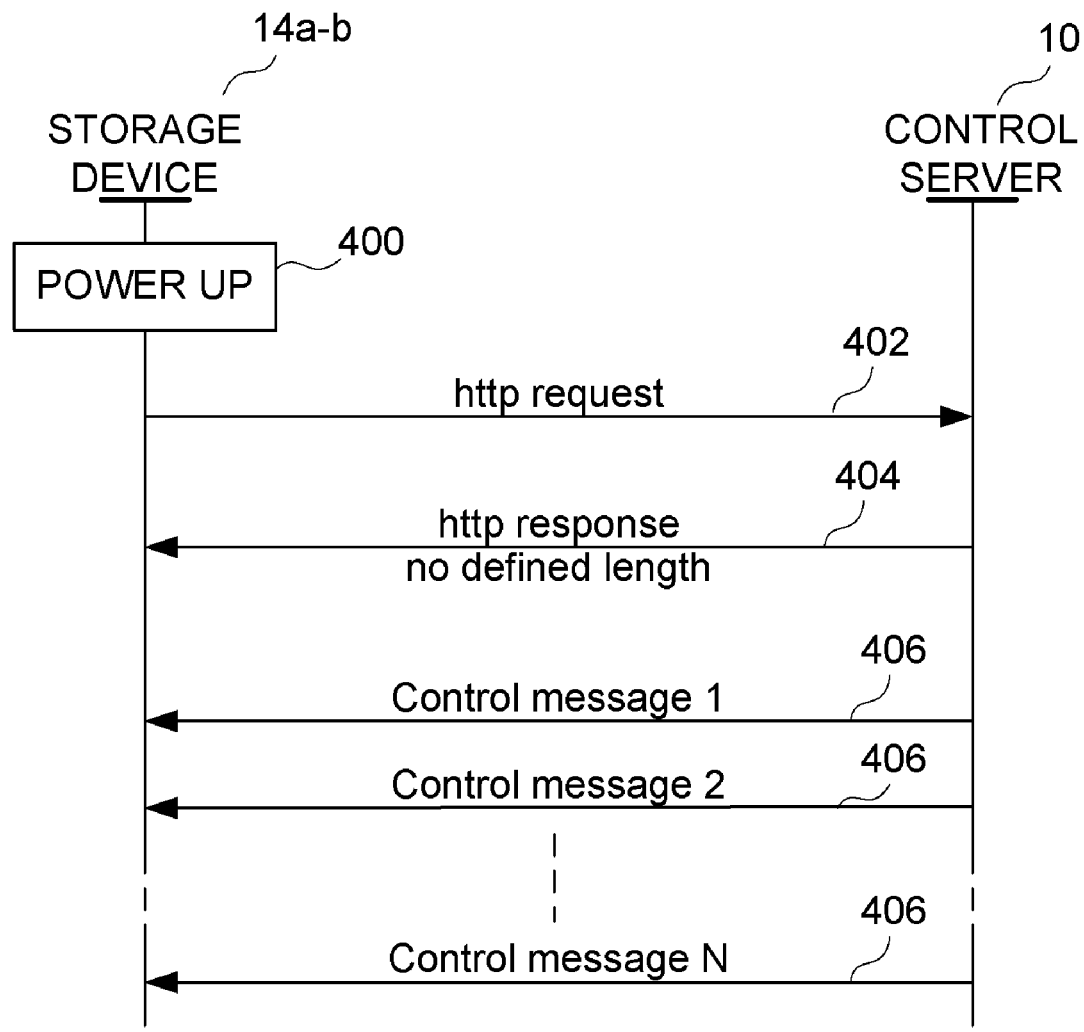
FIG. 6b is a timing diagram showing signalling used in one embodiment to set up communication through a access limiting device.

The opening of a communication path from the control server through the network access limiting device to a storage device may, according to one embodiment, be set up as a control connection from the control server 10 to the storage device 14a-b through the access limiting device 46, see FIG. 4 and FIG. 6b. The set up is realized by making the storage device 14a-b send an http request 402 to the control server 10. The http request may be sent by the storage device 14a-b upon power up 400, upon detection of a network connection, upon pressing a button, upon keying a code, upon receipt of detection event indicating an alarm, etc.

The control server 10 then responds to this request by sending an "endless" http response 404 to the storage device 14a-b. The length of the content of the endless http response 404 is not specified or may be specified as a large number in the http response and, thereby, the underlying TCP connection is not terminated by the control server 10. This results in that the access limiting device 46 and the storage device 14a-b do not consider the response terminated and, thereby, an open path from the control server 10 through the access limiting device 46 to the storage device 14a-b is created. In the case of the content length being specified as a large number, the response is not terminated until the amount of data corresponding to the large number has been sent. The control server 10 may utilize the open path to control the storage device 14a-b by sending control messages 406 (control message 1-N) to the storage device 14a-b, wherein N is an unlimited number. The control messages 406 may be initiated by the control server 10. As a result of the open path the control server 10 is able to send control messages 406 at any time, i.e. the control server 10 do not have to wait for any polling signal from the monitoring device and, thus, there is essentially no latency.

The http response, which is creating the open path, may also be described as an http response including a plurality of control messages 406 dispersed in time or as an http response in which the content length is set to a number that is large enough to enable transport of a plurality of future control messages as part of an over time stretched http response. This may be achieved by not defining the length of the content of the http response or by setting the length of the content of the http response to a large number. In the case of setting the length of the content to a large number, the large number is to be selected as large as a plurality of control messages 406 may be sent by means of the http response without termination of the http response and consequently the open path. In some cases such a large number may be 18 kilobytes, if the initial packet of the http response only is some bytes and if the subsequent control messages also are rather small. However, such a large number may also be two megabytes or greater if the control messages are of larger size. Additionally, the size of the length of the content also depends on the desired duration of the open path. In some applications the network load is not much affected if a new open path is set up once every hour, but in other applications it may be desirable to keep the open path open for a day or more in order not to noticeably affect the network load.

Accordingly, the open path is the communication link into the private network 44 for control server 10 initiated messaging, as depicted by the control message 406 1-N in FIG. 6*b*. The control messages 406 may be utilized to control the storage device 14*a*-*b* from a terminal of a user, such instructions are relayed or translated and sent via the open path by the control server 10. Further, the control messages 406 may be utilized to check the status of the storage device 14*a*-*b*, to test that the storage device is operating correctly, to control the status of the open path connection, to provide configuration data to the storage device 14*a*-*b*, to request the storage device 14*a*-*b* to set up a new or other connection or to request the storage device to deliver data, e.g. monitoring data or other data of interest, to a specific destination. The monitoring devices 20-22 may also be connected to the control server by an open path. Further information regarding connections through network access limiting devices may be found in the international application WO 2006/073348 by Axis AB.

As shown in FIG. 4 and discussed in FIG. 6*a*, the monitoring system may include a plurality of storage devices 14*a*-*b*. As the storage operation scheme is controlled by the control server the instructions of interaction may be set to allow different levels of redundancy in the system. In order to facilitate the understanding the description below is limited to describe the processing of data originating from a single monitoring device. However, the skilled person would understand that each storage device may store monitoring data from a plurality of monitoring devices.

Figure 7A:
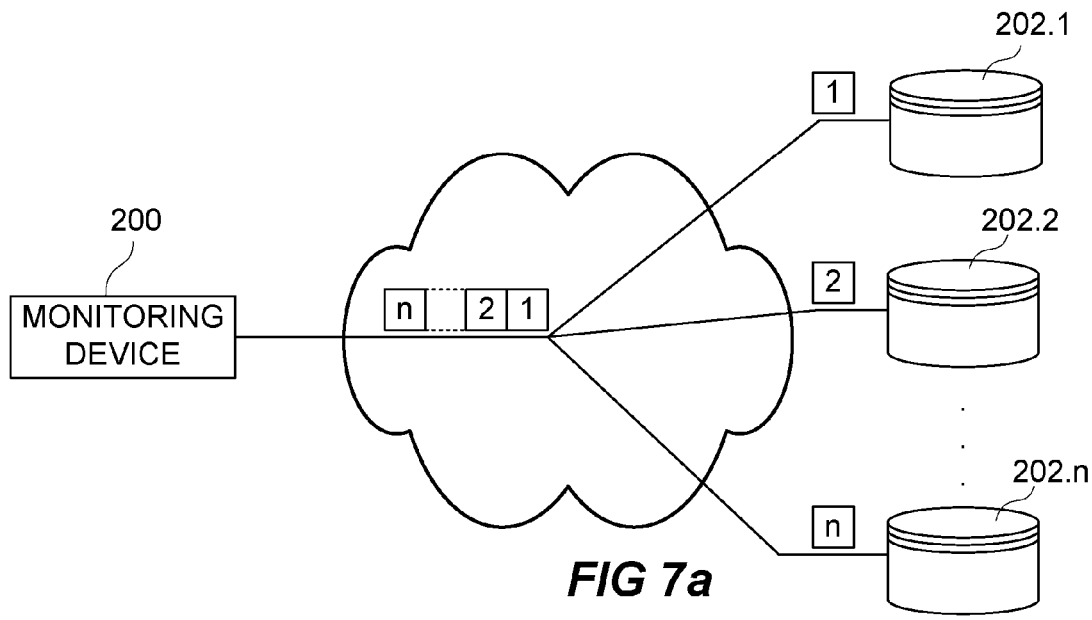
FIGS. 7a and 7b are schematic diagrams, each showing a storage strategy including splitting of generated information for storage at different storage devices.

According to one embodiment, see FIG. 7*a*, the monitoring data from the monitoring device 200 is equally distributed onto the n storage devices 202.1-202.*n* accessible for storage by means of one of the above methods, i.e. either by the monitoring device controlling the sending of monitoring information to the storage device or the storage device requesting monitoring information from the monitoring device. In other words, either the monitoring device 200 or the storage device 202.1-202.*n* controls the transfer. The monitoring information may be requested at a specific data rate or sent at a specific data rate to a specified storage device, depending on which device controlling the transfer. By implementing such a storage scheme the system will, for example, secure a video sequence of (n−1)/n quality even when one storage device fails totally. If n=2, i.e. two storage devices is connected to the monitoring device for storing video sequences, a video sequence having half the quality, i.e. ½, is remaining even when one storage device fails. Hence when loosing a storage device the quality of the monitoring information is only degraded not lost. This may be particularly interesting for monitoring information having quite high update frequency, e.g. video sequences having a frequency of 10-60 frames per second.

Figure 7B:
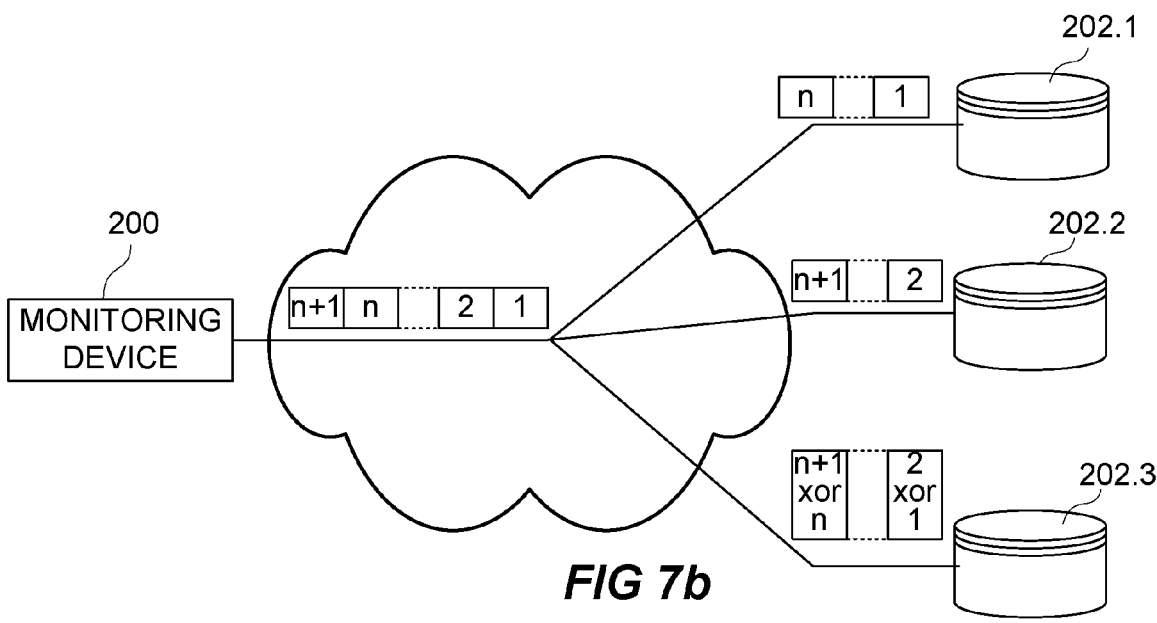

According to yet another embodiment, a portion of the monitoring data from a monitoring device is stored on a first storage device, another portion of the monitoring data is stored on a second storage device, and parity data calculated from the portion stored on the first storage device and the portion stored on the second storage device is stored on a third storage device. The calculation of parity data is arranged to enable calculation of the monitoring data of the first storage device from the monitoring data of the second storage device and the parity data and/or enable calculation of the monitoring data of the second storage device from the monitoring data of the first storage device and the parity data. In one specific embodiment, see FIG. 7*b*, the monitoring data from the monitoring device 200 is equally distributed onto, for example, two storage devices 202.1-202.2 and parity data from the monitoring data stored on the two storage devices are stored on a third storage device 202.3. Calculation of the parity data may be performed by applying an XOR, i.e. exclusive OR, operation on a bit from storage device 202.1 and a bit from storage device 202.2 and repeat the operation for each bit of the two storage devices 202.1-202.2.

Figure 8:
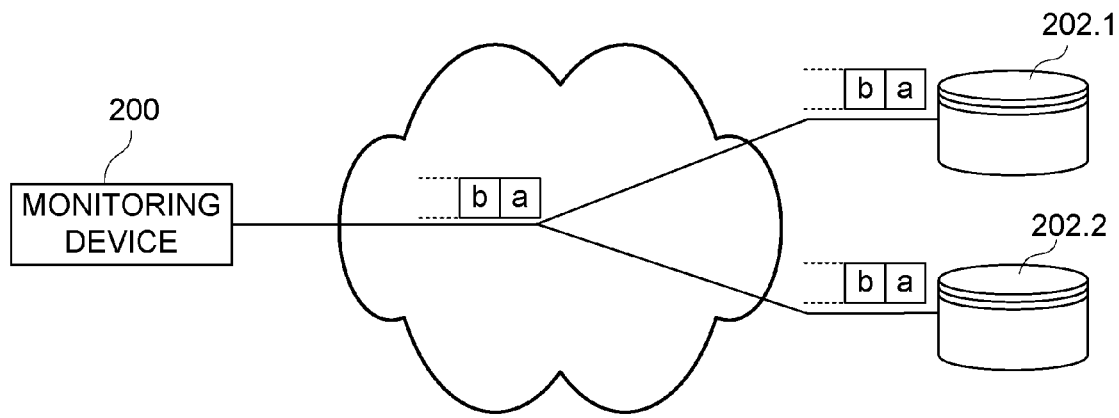
FIG. 8 is a schematic diagram showing a storage strategy including storing the same data at least at two storage devices.

According to another embodiment, see FIG. 8, the same monitoring data is sent from the monitoring device 200 to two separate storage devices 202.1 and 202.2. This results in a redundant system where no information is lost or degraded, which may be desired for critical information.

Figure 9:
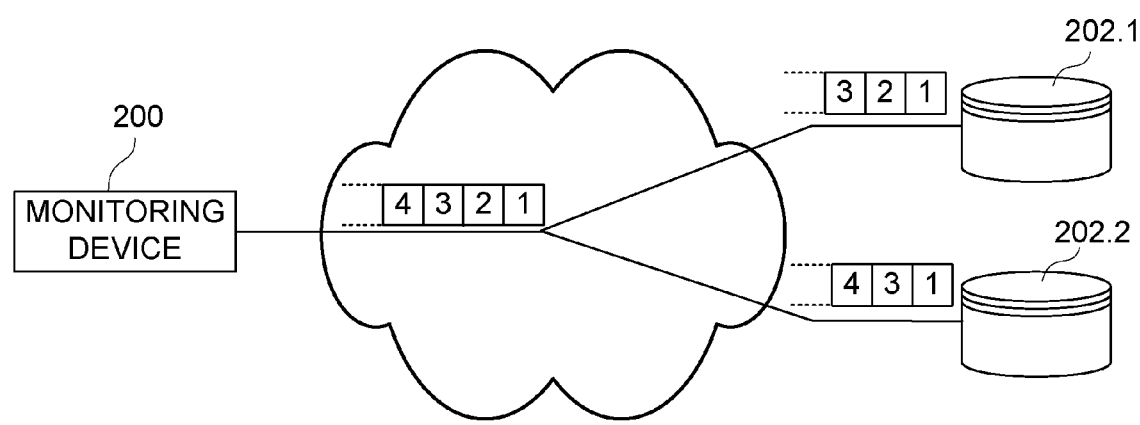
FIG. 9 is a schematic diagram showing a storage strategy combining the strategies of FIG. 7 and FIG. 8.

According to a further embodiment, see FIG. 9, the schemes may be combined. For example may half of the monitoring data be stored at both storage devices, see monitoring information packet 1 and 3 in FIG. 9. Then the rest of the monitoring information may be stored according to the scheme that every second monitoring information packet is stored at storage device 202.1 and the monitoring information packets there between are stored at storage device 202.2. In more general terms two storage devices may be dedicated to be redundant in view of part of the monitoring information and the rest or the monitoring information is alternately stored at n storage devices 202.1-202.*n* in turn.

According to one embodiment, the control server will be notified when a storage device fails and stops storing monitoring information. According to one embodiment, the storage device may be arranged to report to the control server if it is unable to contact a monitoring device which it is supposed to be able to contact or to report if monitoring information expected to arrive at the storage device does not arrive. According to another embodiment, the monitoring device may be arranged to report to the control server if a storage device do not confirm receipt of data. According to yet another embodiment, the storage device may be arranged to regularly send a status report to the control server and a failure of providing a status report may indicate to the control server that the device is not operating properly. In response to the notification of a storage device failing, the control server will re-route the monitoring information bound to that storage device for storing. For example, the control server may send out new instructions of interaction to the monitoring devices having instructions of interaction instructing it to save monitoring information in the failed storage device sending the monitoring information destined to the failed storage device to one or a plurality of other accessible storage devices. According to another example, the control server may send out new instructions of interaction to the other fully operational storage devices in order to instruct these storage devices to store the monitoring information destined to the no longer operational storage device, i.e. the monitoring information that the no longer operational storage device where instructed to request from monitoring devices. Accordingly, the control server instructs one or a plurality of storage devices to share the burden of storing the monitoring information intended for the non-operational storage device by instructing each of them to request specific portions of the monitoring information intended for the non-operational storage device.

The testing of the system as mentioned above in connection with FIG. 6*a* may, according to one embodiment of the invention, include the following process. In response to a new device (e.g., a storage device or a monitoring device) being connected to the system or in response to a user ordering testing of the system, the control server sends out test requests. Now referring to FIG. 10, in one embodiment of this process, most likely used in response to a new device being connected to the system, the control server send a test request, step 240, to the new device connected to the system. In this example it is assumed that the new device is a storage device. The test request from the control server to the new storage device includes addresses to a plurality of devices connected to the monitoring system, an instruction ordering the storage device to send a request to these devices connected to the system and to return an indication of status of the communication path to each device. When this test request is received at the storage device, the storage device successively send a test message, step 242, to each of the device addresses included in the test request from the control server. Each test message includes the storage device sending a request of a predetermined amount of monitoring information to an address. Further, a timer is started when the request is sent. The time it takes for the monitoring information to be received at the storage device is registered, step 244, and used as a quality parameter for the communication with the device. If no response is received to the request, the device is deemed not accessible from the storage device. When all devices addressed in the test request from the control server has been tested, then the resulting parameters of each test is sent to the control server, step 246.

Figure 11:
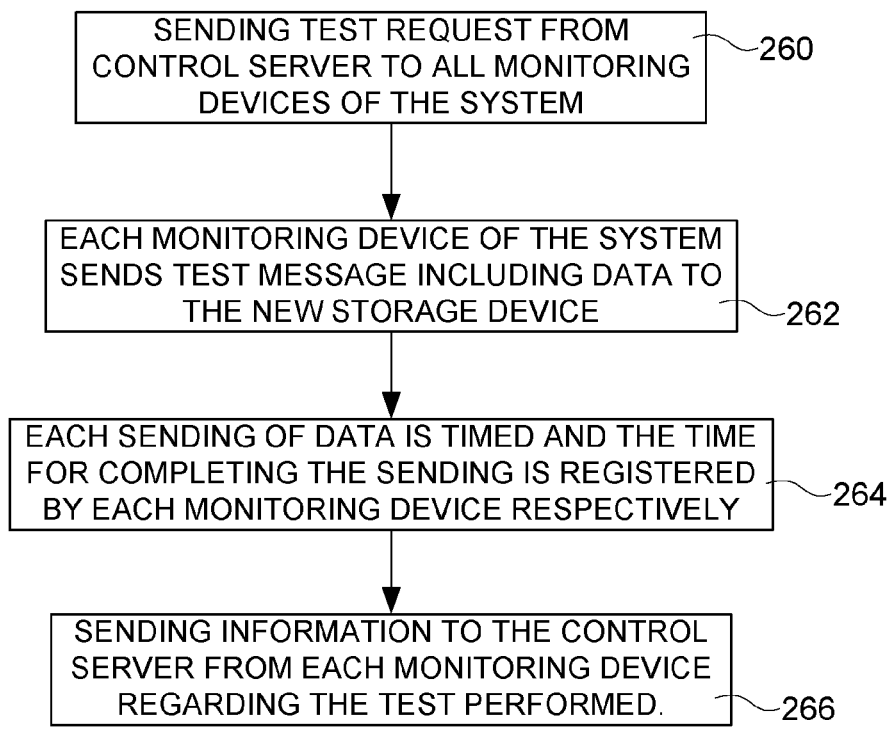
FIG. 11 is a flowchart of another method for testing the communication paths of the system.

Now referring to FIG. 11, in one embodiment of the process of testing, the control server sends a test request to all monitoring devices already part of the monitoring system instructing them to test the communication path to the address of the new storage device, step 260. In response to this test request, each monitoring device sends a test message including data of a predetermined length to the new storage device, step 262. When the sending of test data is started, a timer in the monitoring device is started, and when an indication of test data being fully transferred to the storage device, the timer is stopped and the time for the transfer is registered, step 264, and used as a quality parameter for the communication path for transfer of data to the new storage device. If the monitoring device is not able to send the data to the storage device, the quality parameter will be set to a value indicating that no connection is present to the new storage device. Each of the monitoring devices sends a result message, including information resulting from the test transmission to the control server, step 266. Such a result message may for instance include the quality parameter.

Figure 10:
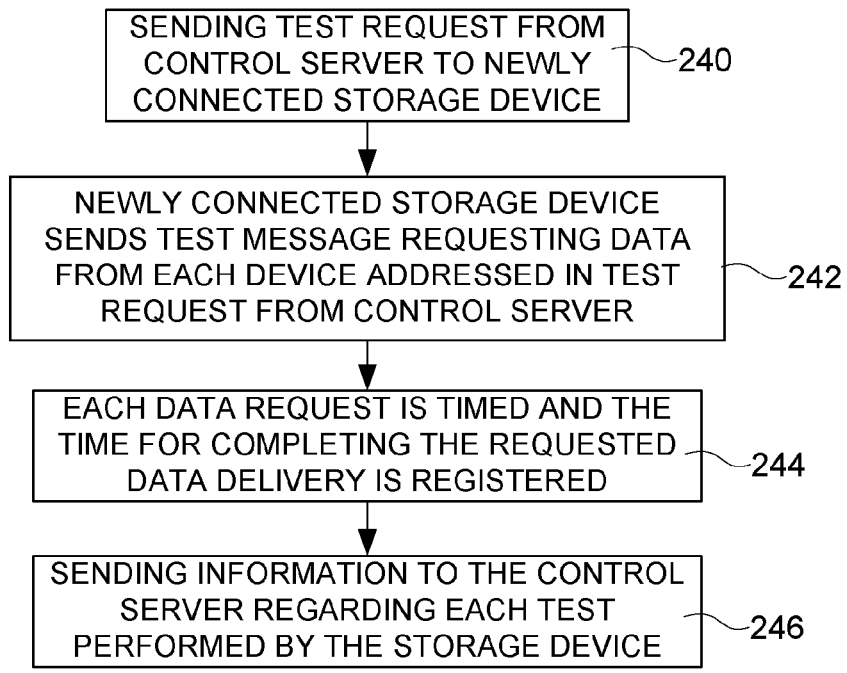
FIG. 10 is a flowchart of a method for testing the communication paths of the system.

In one embodiment, both test methods described in connection with FIGS. 10 and 11 are combined. By combining both methods, optimizing of storage of monitoring data may be facilitated. One reason for this is that the best communication path between two devices may be a communication path, which would not have been detected using only one of the methods.

The storage operation scheme of the monitoring system and the instructions of interaction for the device may, according to one embodiment, be based on a specific rule. The rule is generated by the control server and is based on the input from the tests of the communication paths performed by the storage devices and/or monitoring devices and on input from a monitoring system manager. The input from the monitoring system manager may, for example, be that the information from one monitoring device A is particularly time critical and important and therefore needs full redundancy, also called prioritized operation. Another monitoring device B may require normal storage conditions. Such a normal storage condition may be the standard selection in an input interface arranged for the monitoring system manager, and therefore, all devices may be handled as if they require normal storage conditions unless other instructions are given by the monitoring system manager.

Based on these inputs, the control server calculates total throughput to and total storage volume for available storage devices. Further, it calculates total bandwidth required for all monitoring devices. Then the control server checks that the storage bandwidth is larger than the bandwidth required for the required performance of the monitoring devices.

A rule for normal operation is created and applied to at least one of the devices involved in the processing of monitoring information requiring normal storage conditions by making the instructions of interaction reflect the rule. This rule may involve spreading the monitoring information from the monitoring device on a plurality of storage devices, in some cases it may even involve spreading the monitoring information from the monitoring device on all storage devices available for the particular monitoring device.

Moreover, a rule for prioritized operation is created applied to at least one of the devices involved in the processing of monitoring information requiring prioritized operation by making the instructions of interaction reflect the rule. In this rule, the monitoring information relating to a monitoring device requiring prioritized operation is arranged to be mirrored on two different storage devices, i.e. a full copy of the monitoring information stored at a first storage device is stored at a second storage device.

Further, a rule for taking care of a failing storage device may be pre- set by the control server or may be generated upon indication of a failing storage device. Such a rule may include regenerating the rules presented above with one of the previous storage devices missing.

Figure 12:
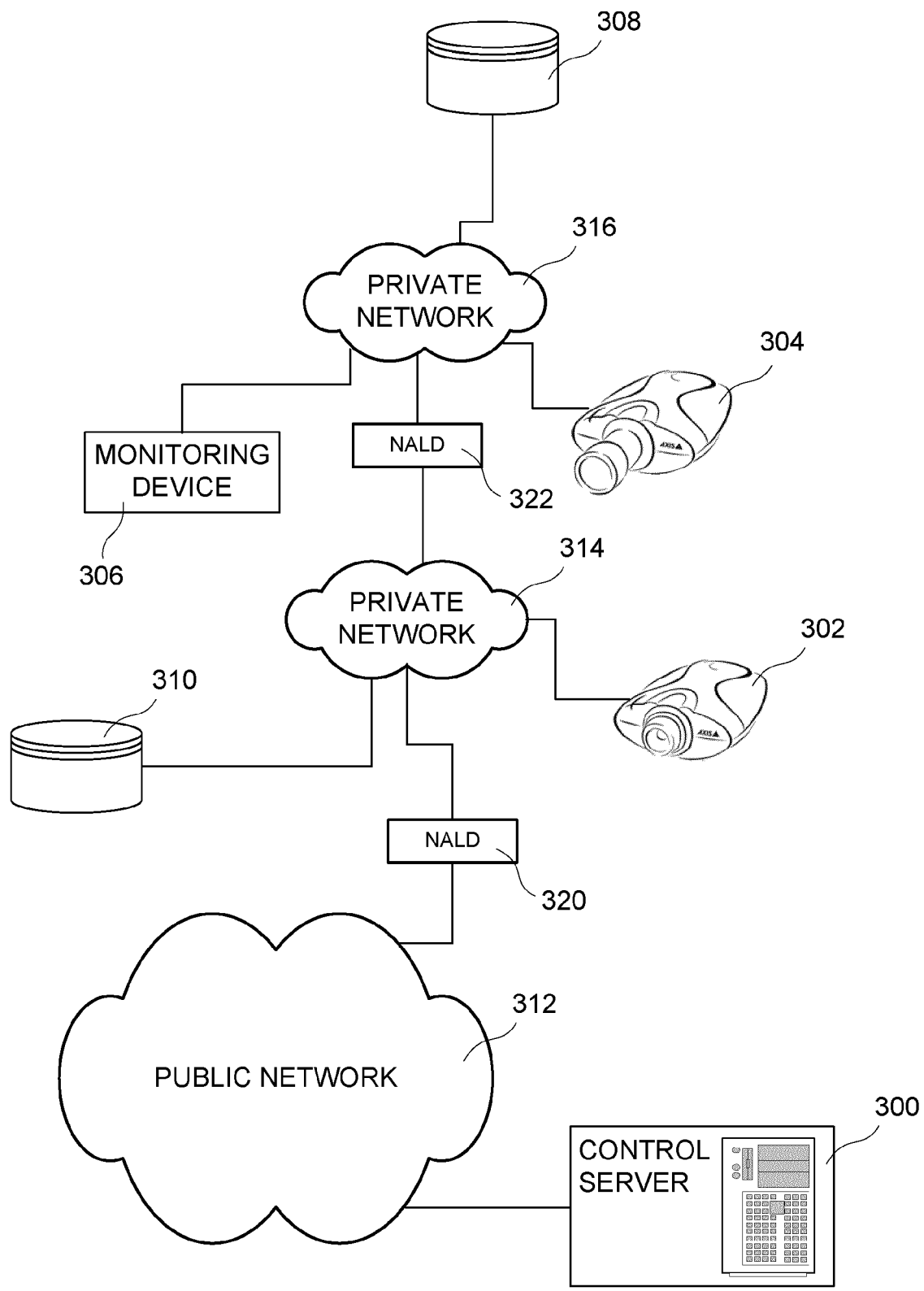
FIG. 12 is a schematic block diagram showing yet another example of the structure of a system implementing the invention.

In order to facilitate the understanding of the testing an example of testing in a specific configuration will be described below with reference to FIG. 12. In this specific configuration the monitoring system includes a control server 300, a monitoring camera 302, a monitoring camera 304, a monitoring device 306, and a storage device 308. The new storage device 310 is to be added to the monitoring system. The devices of the system are connected to each other via a public network 312, a first private network 314, and a second private network 316. The public network 312 is connected to the first private network 314 via a first network access limiting device 320 and the second private network 316 is connected to the first private network 314 via a second access limiting device 322. Moreover, the control server 300 includes a storage control scheme for the present configuration. The new storage device is then connected to the private network 314 and sends a connection message to an address stored in its memory. The address is pre-programmed into the storage device and is the address of the control server 300. Hence, the connection message arrives at the control server 300 and the control server are now able to send control messages and commands to the new storage device 310 through the network access limiting device 320 in responses to the connection message from the storage device. The new storage device 310 provides the control server 300 with information associated with the new storage device, e.g. a unique identifier. The control server 300 then either finds a corresponding unique identifier already registered in the control server 300 or waits for someone to register it. When the unique identifier of the new storage device 310 is matched to a unique identifier registered at the control server 300 the monitoring system of the new storage device may be identified as the monitoring system with which the unique identifier has been associated.

Now that the new storage device is identified and associated to a monitoring system the control server initiates a test sequence in order to find out the quality of the communication paths between the different devices, e.g. from the monitoring devices to the new storage device and from the new storage device to the monitoring devices. The test sequence includes the control server 300 sending a test request to the new storage device 310 and a test request to each of the monitoring devices, 302-306, registered in the monitoring system. The test request to the new storage device 310 includes address information to all the monitoring devices, 302-306, of the monitoring system.

When the test request is received at the new storage device 310, the new storage device 310 sends a test message to a first one of the monitoring devices 302 requesting data of a predetermined length. At the same time as the test message is sent, a timer is started at the new storage device. The monitoring camera 302 receives the test message for the data of predetermined length and responds by transmitting such data to the new storage device 310. When all data requested has been received at the new storage device 310, the timer is stopped and the time it took from the sending to the test message including the request was sent until the data was successfully received at the storage device 310. The value of the timer is registered and used as a quality parameter of the capacity of transferring by means of a request from the new storage device 310.

Then the new storage device sends a test message to a second one of the monitoring devices 304 including a request for data of a predetermined length. The second monitoring device is connected to the second private network 316 being connected to the first private network 314 via the network access limiting device 322, which is arranged to limit access from the first private network. Hence, the test message from the new storage device 310 does not get through to the monitoring device 304. This is detected by the new storage device 310 which register this communication path as not available and set the quality parameter to a value indicating this fact. One indication of a test message not getting through to the monitoring device may be the receipt of a network connection error at the storage device. Another indication may be that no response is being received within a specified time period. The situation is identical for a test message sent to a third monitoring device 306.

Information relating to the different communication paths is sent to the control server 300 to be used in the process of determining a storage control scheme. This information includes the quality parameters of each of the communication paths. According to one embodiment, the test messages are sent from the storage device simultaneously, e.g. using the same message and addressing it to a plurality of monitoring devices.

The control server 300 also sends test requests to each of the monitoring devices 302-306. When the test request arrive at the first monitoring device it responds by sending a test message including data of a predetermined length to the new storage device and starting a timer for timing the transmission. When all data has been sent to the new storage device the value of the timer is registered as the quality parameter of this communication path. Each of the second and third monitoring devices 304-306 also receives a test request and both perform transmission of a test message including data in the same way as the first monitoring device 302. Both of these test data transmissions are successful because the network access limiting device is not stopping communication in the direction from the second private network to the first private network. The test results, including the quality parameters, from all the monitoring devices 302-306 are sent to the control server for use in the process of determining the storage control scheme.

At the control server 300, a storage control scheme then is generated and the test has provided the information that monitoring information from second and third storage devices 304-306 only can be transmitted to the new storage device if these monitoring devices control the transmission. The transmission of monitoring information from the first monitoring device 302 to the new storage device may be controlled by either the new storage device or the first monitoring device.

According to one embodiment, the storage control scheme may be manually generated by a user presented with the test information. According to another embodiment, the control server 300 automatically generates a storage control scheme based on the test information in combination with other information relating of the monitoring system.

What is claimed is:

1. A method for connecting a storage device to a monitoring device, the method comprising:

transferring, in response to connecting the storage device to a computer network without user entry of information, an identifying message from the storage device to a control server, the control server arranged to manage user access to a monitoring system and to enable access to surveillance data originating from monitoring devices of the monitoring system, via the computer network, wherein the identifying message includes a unique identifier uniquely identifying the storage device;

matching the unique identifier to a registered monitoring system including at least one monitoring device;

transferring a test request from the control server to the storage device, the request including addresses to monitoring devices registered as part of the matched registered monitoring system;

sending from the storage device in response to the transfer of a test request a test message to the addresses included in the test request for testing of the connection to each of the monitoring devices assigned the addresses;

identifying at least one monitoring device included in the matched monitoring system;

transferring a configuration message from the control server to the storage device, wherein the configuration message includes an address to the identified at least one monitoring device and instructions of interaction;

transferring a request from the storage device to the monitoring device for monitoring information generated by the monitoring device, the request is formed in accordance with the instructions of interaction;

transferring monitoring information generated by the monitoring device from the monitoring device to the storage device in accordance with the request; and storing transferred monitoring information at the storage device.

2. The method according to claim 1, wherein the transferring of monitoring information generated by the monitoring device includes transferring image information representing an image sequence generated by the information generating device and wherein the image information is divided into image information portions.

3. The method according to claim 2, further comprising receiving at a first storage device image information defining every $n^{th}$ image information portion of the image sequence transferred from the monitoring device and receiving at a second storage device image information of the image sequence defining a frame transferred from the monitoring device in between the frames transferred to the first storage device.

4. The method according to claim 3, wherein the registered monitoring system comprises two or more monitoring storage devices, wherein n equals the number of storage devices receiving image information from the monitoring device and wherein each one of n-1 storage devices receives image information defining one image information portion in between the receipt of image information defining an image information portion at the first storage device.

5. The method according to claim 4, wherein n equals two and thereby a first storage device, of the resulting two storage devices, receives and stores image information defining every second image information portion of the image sequence transferred from the monitoring device and a second storage device receives and stores image information defining the image information portions between the image information portions received and stored by the first storage device.

6. The method according to claim 1, further comprising:
returning a test result, resulting from the sending of the test message, to the control server;
analyzing the test result at the control server; and
generating instructions of interaction based on the analysis.

7. The method according to claim 6, wherein the test result includes information indicating accessibility of devices from the device sending the test message.

8. The method according to claim 1, wherein the transfer of an identifying message from the storage device to the control server is transferred from a private network to a public network, wherein the private network is connected to the public network via an access limiting device.

9. The method according to claim 1, further comprising:
transferring a test request from the control server to a monitoring device of the matched registered monitoring system, the request including an address to the storage device; and
sending from the monitoring device in response to the transfer of a test request a test message to the address included in the test request for testing of the connection from the monitoring device.

10. The method according to claim 1, wherein the transferring of the instructions of interaction includes transferring information instructing the storage device to request a specific data rate from a specific monitoring device.

11. The method according to claim 1, wherein the transferring of the instructions of interaction includes transferring information instructing the monitoring device to transmit a specific data rate to a specific storage device.

12. The method according to claim 1, further comprising:
identifying a second storage device included in the matched registered monitoring system;
transferring a configuration message and instructions of interaction from the control server to the second storage device; and
transferring, in response to receipt of the configuration message, a request from the second storage device to the monitoring device for monitoring information generated by the monitoring device.

13. The method according to claim 1, further comprising:
identifying a second storage device included in the matched registered monitoring system; and
transferring a configuration message and instructions of interaction to the monitoring device from the control server, the configuration message includes the address to the first storage device, the address to the second storage device, and instructions of interaction instructing the monitoring device to transmit a portion of the monitoring information to the first storage device and a portion of the monitoring information to the second storage device.

14. A method for connecting a storage device to a monitoring device, the method comprising:
transferring, in response to connecting the storage device to a computer network without user entry of information, an identifying message from the storage device to a control server, the control server arranged to manage user access to a monitoring system and to enable access to surveillance data originating from monitoring devices of the monitoring system, via a computer network, wherein the identifying message includes a unique identifier uniquely identifying the storage device;
matching the unique identifier to a registered monitoring system including at least one monitoring device;
transferring a test request from the control server to the storage device, the request including addresses to monitoring devices registered as part of the matched registered monitoring system;
sending from the storage device in response to the transfer of a test request a test message to the addresses included in the test request for testing of the connection to each of the monitoring devices assigned the addresses;
identifying at least one monitoring device included in the matched monitoring system;
transferring a configuration message from the control server to the at least one monitoring device, wherein the configuration message includes an address to the storage device and instructions of interaction;
transferring monitoring information generated by the at least one monitoring device from the at least one monitoring device to the storage device in accordance with the instructions of interaction; and
storing transferred monitoring information at the storage device.

* * * * *